United States Patent [19]
Simon

[11] Patent Number: 5,049,703
[45] Date of Patent: Sep. 17, 1991

[54] MAINS CONNECTION BOX

[76] Inventor: Hans Simon, Bruchhausener Strasse, D-5463 Unkel/Rheim, Fed. Rep. of Germany

[21] Appl. No.: 417,264

[22] Filed: Oct. 5, 1989

[30] Foreign Application Priority Data

Oct. 11, 1988 [DE] Fed. Rep. of Germany ....... 3834626

[51] Int. Cl.$^5$ .............................................. H05K 5/00
[52] U.S. Cl. ..................................... 174/52.1; 174/59
[58] Field of Search .................... 174/52.1, 59, 50, 51, 174/48, 49; 361/331, 332, 333, 334, 380, 427; 493/941

[56] References Cited

U.S. PATENT DOCUMENTS 3,809,969 5/1974 Williams et al. ..................... 361/332

OTHER PUBLICATIONS

Herd–Anschlubkaste Hak, Hans Simon KG.

Primary Examiner—Leo P. Picard
Assistant Examiner—Bot L. Ledynh

[57] ABSTRACT

The invention relates to a mains connection box for electrical machines and appliances, on the bottom or base plate of which there are chambers to accommodate connecting terminals for the wires of the connection cable and which can be covered by a cover. A suppressor filter is supported and contracted directly on the box or on its bottom plate. For this purpose, the mains connection box or its bottom plate comprises a mount or support for a radio suppressor filter and contacts for connecting the contacts of the suppressor filter to the wires of the connecting cable.

8 Claims, 7 Drawing Sheets

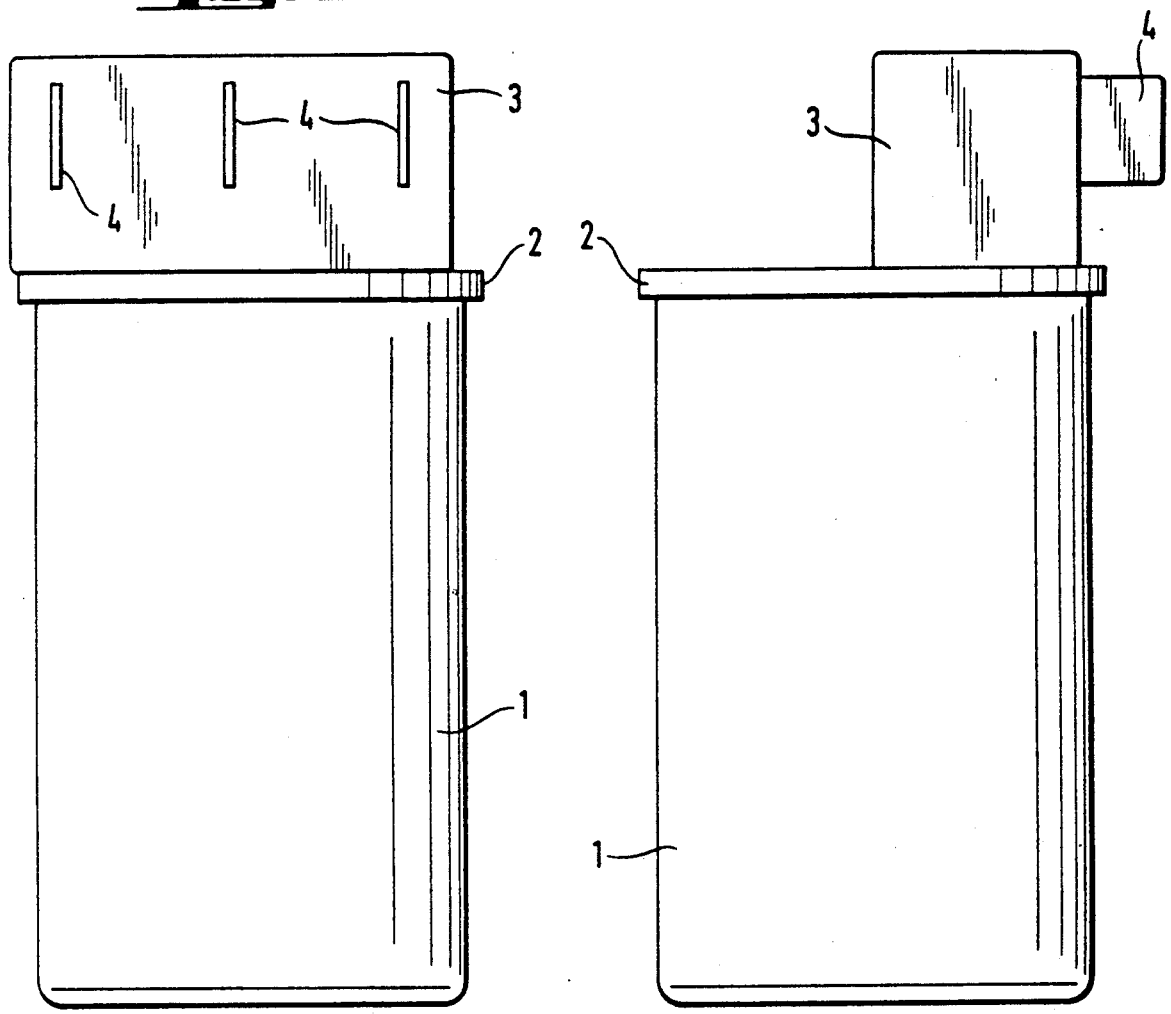
Fig. 1
Fig. 2
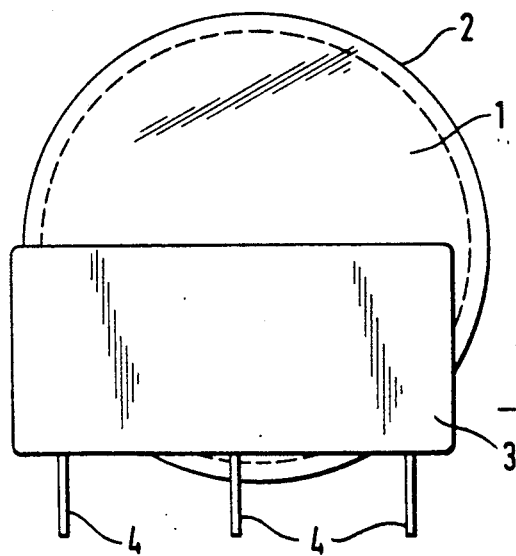
Fig. 3

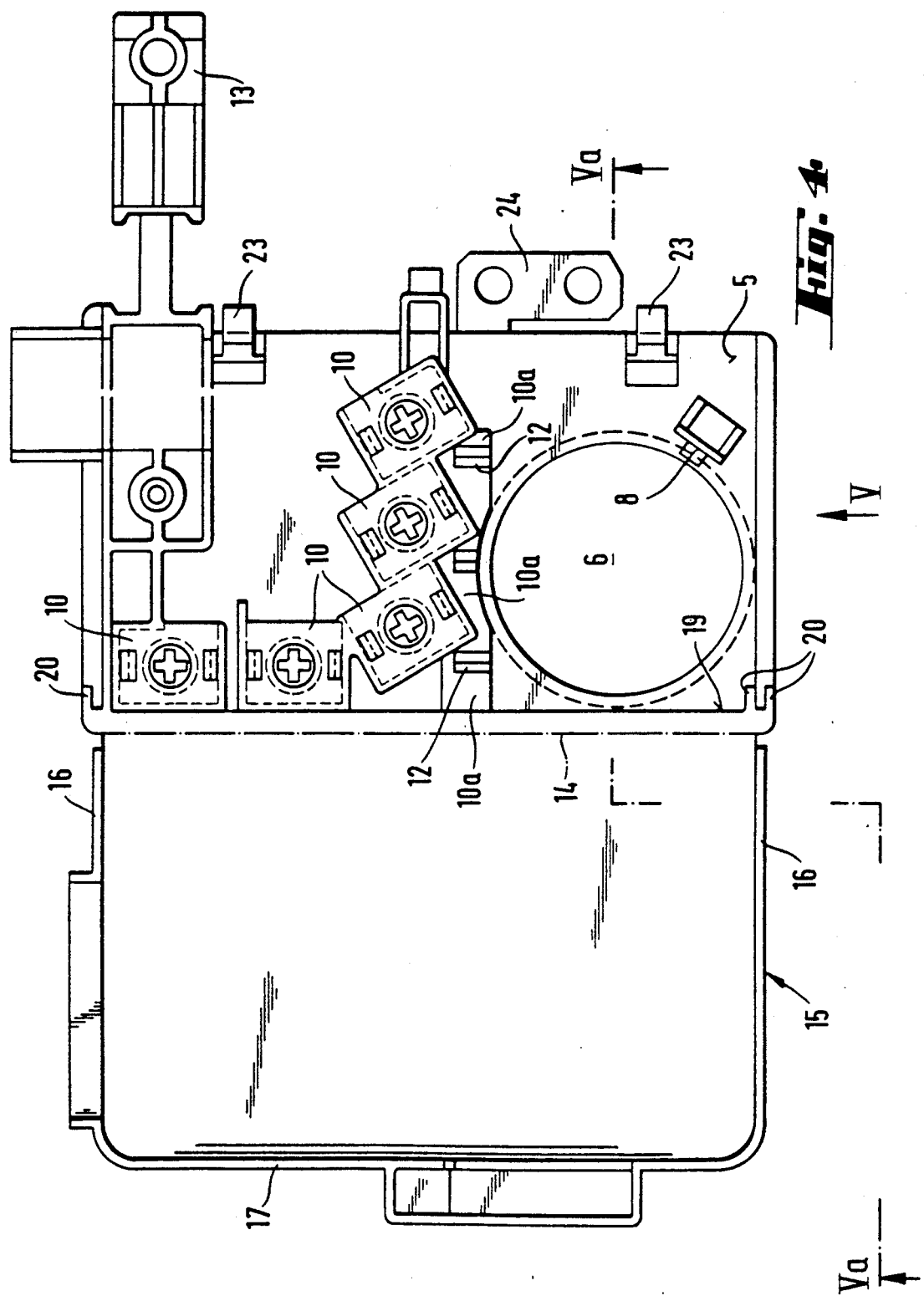

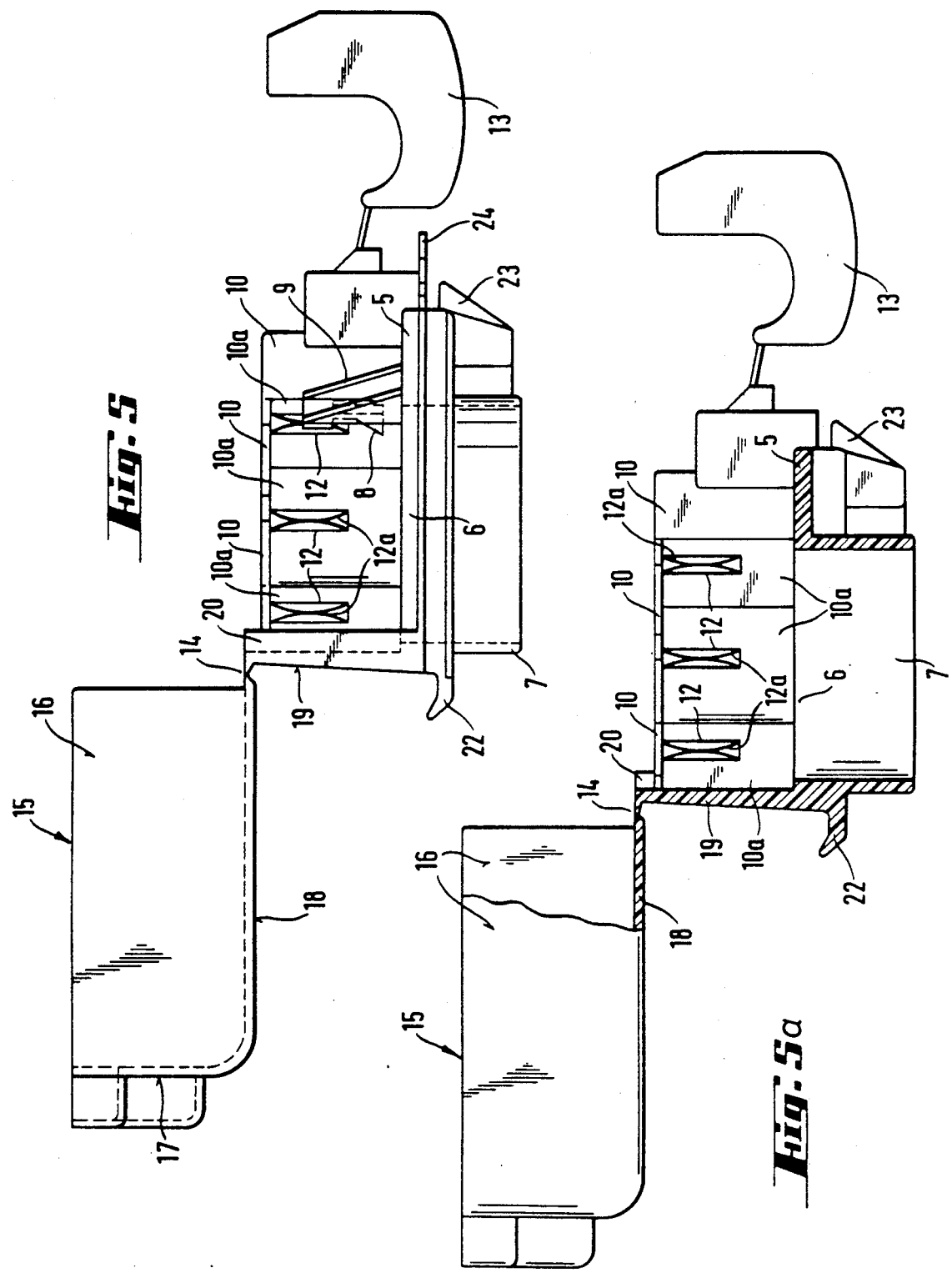

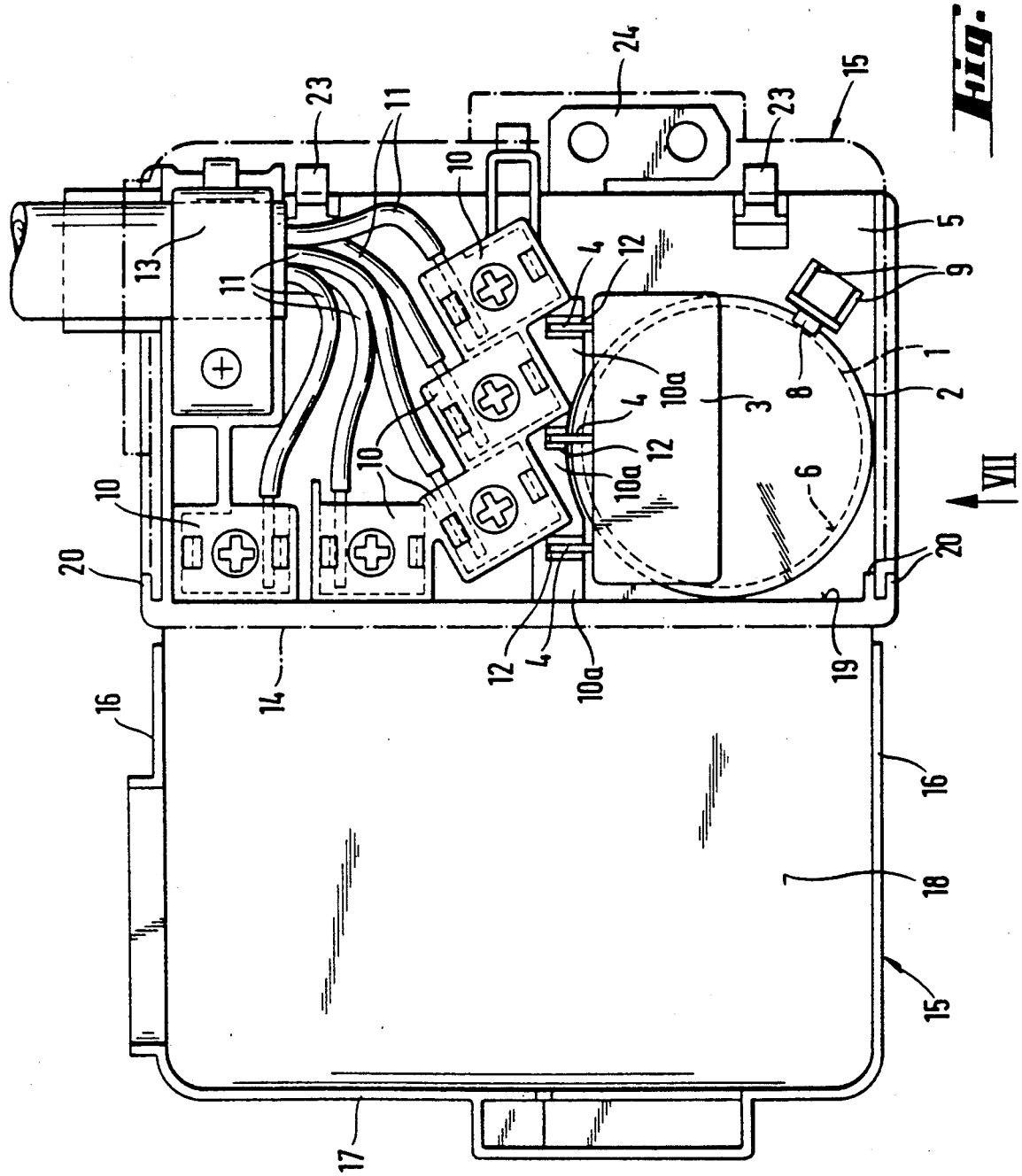

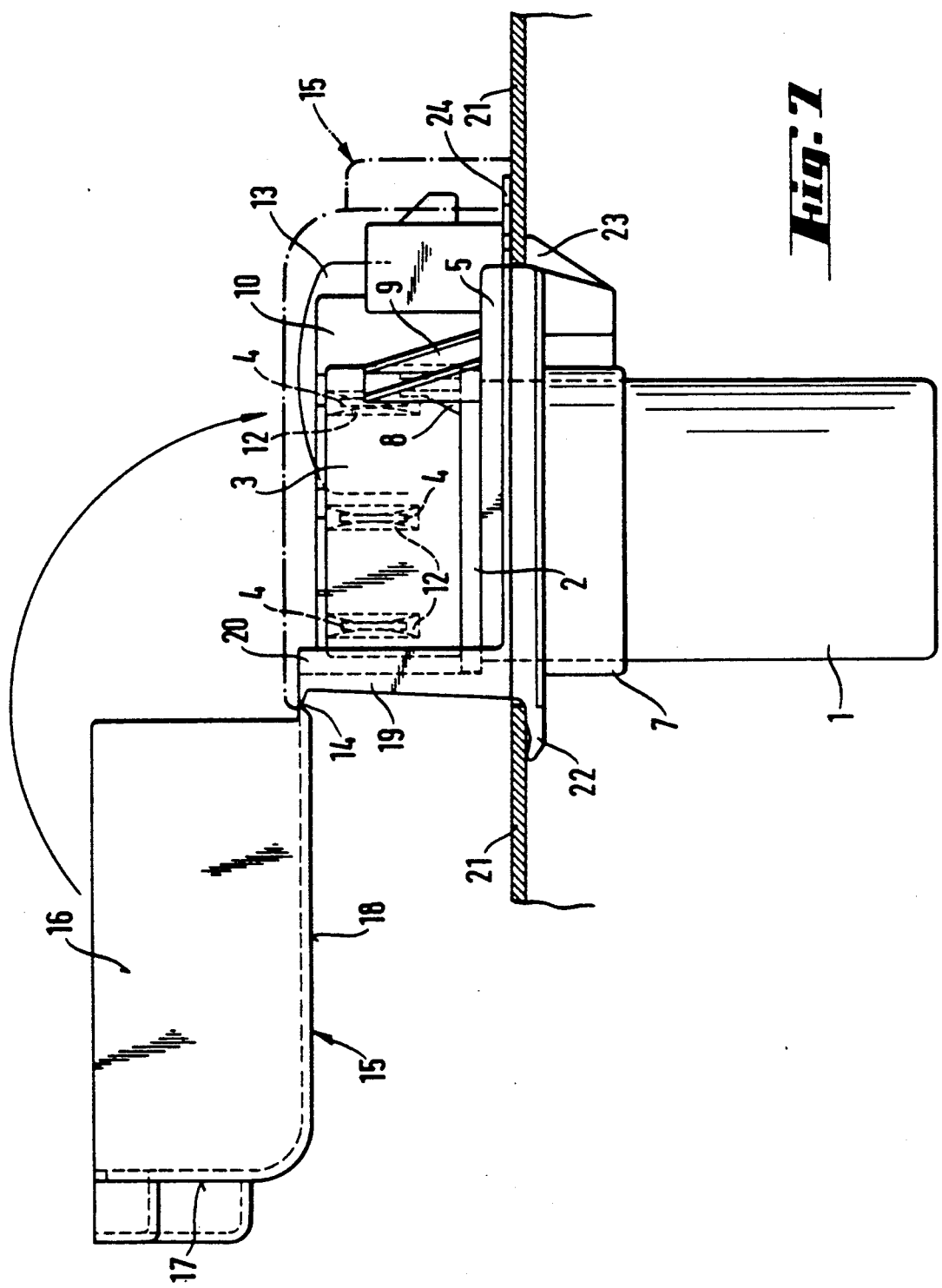

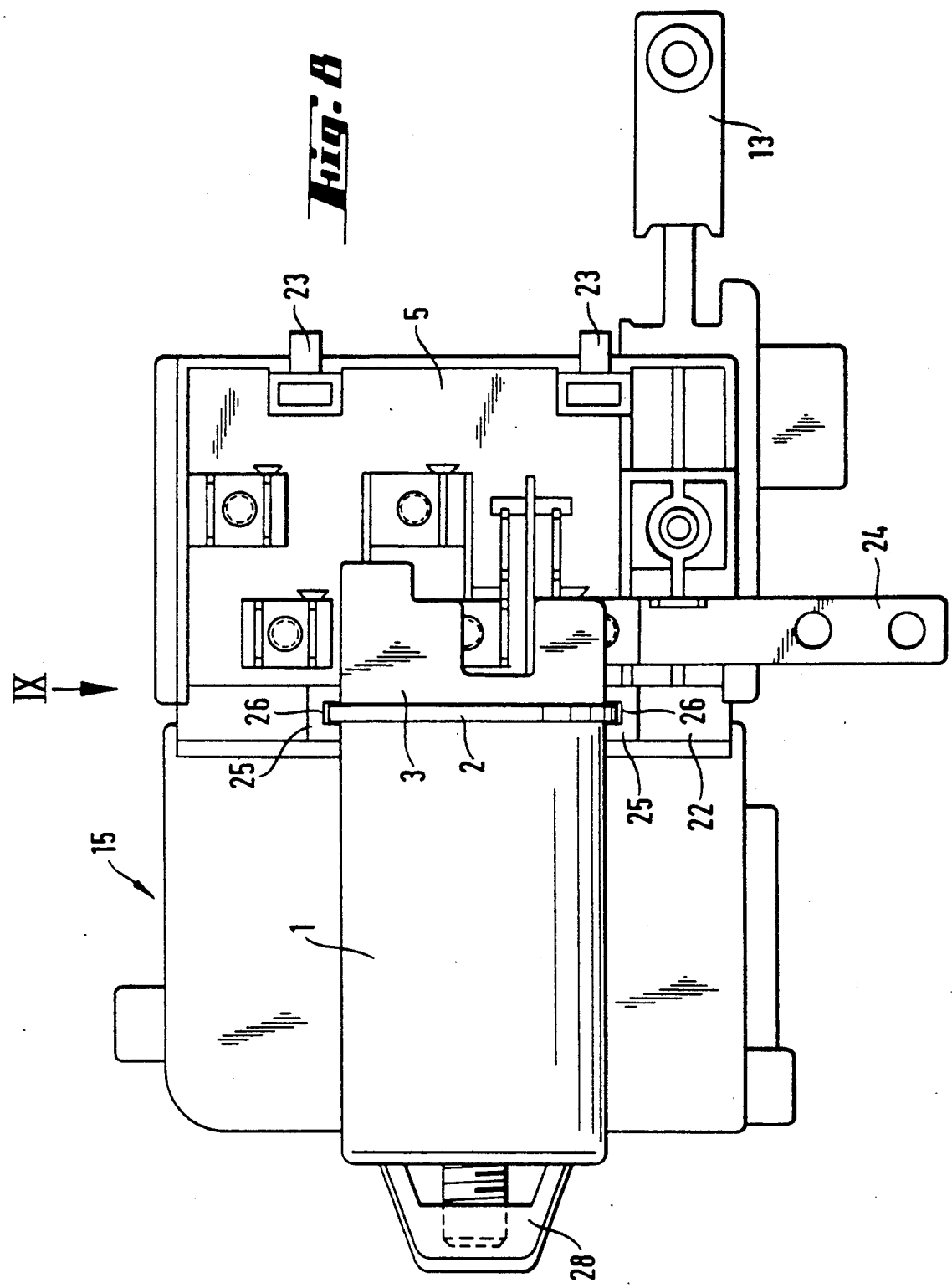

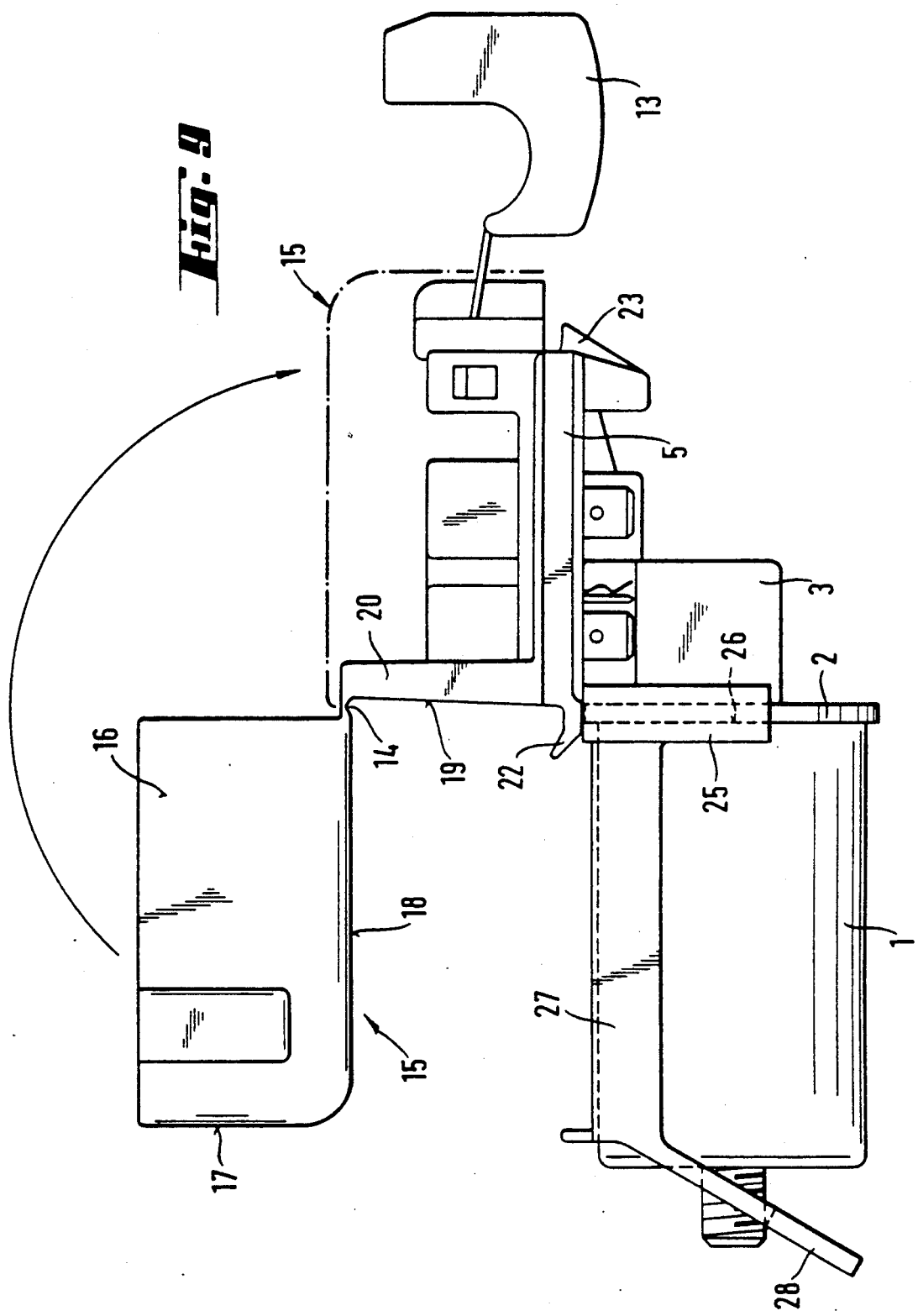

MAINS CONNECTION BOX

BACKGROUND OF THE INVENTION

The invention relates to a mains connection box. In particular the invention relates to a mains connection box of a kind in which on a bottom or base plate of the box there are chambers to accommodate connection terminals for the wires of the connection cable. Such a mains connection box is known from DE-OS 34 30 756.7 of the Applicant.

Modern electrical machinery and appliances are mostly fitted with a suppressor by which electrical pulses created in the appliance can be kept remote from the mains in order not to interfere with radio and television receivers as well as personal computers and the like. Also, excess voltages or current surges which might occur in the mains supply can be kept remote from the appliance or machine. This suppressor or filter is constructed like a cup in which there is a capacitor and/or choke coils. The cup is closed at both ends. At one end or cover of the cup, connecting wires or contacts emerge to which the feed wires of the mains cable can be connected.

Hitherto, the suppressor has been accommodated inside the electrical appliance. Therefore, fitment of the suppressor is complicated and expensive. In particular, the connecting wires of the suppressor have to be specially connected to the wires of the connecting cable so that appropriate and separate contact means must be provided in the appliance.

Furthermore, the separate connecting wires of the filter are functionally disadvantageous and it would be better if the filter were to take effect directly at the point where the mains cable enters the electrical appliance.

SUMMARY OF THE INVENTION

In contrast, the invention is based on the problem of so developing a mains connection box that the suppressor or filter is supported directly on the connection box or on its bottom panel, the contact means provided on the suppressor being connected directly to corresponding contacts on the connection box and thus to the wires of the mains cable so that the previously required feed wires from the suppressor to the mains connection box are no longer required. In this respect, there is the particular difficulty that compared with the mains connection box, the suppressor filter is so large that it cannot—or at least cannot completely—be accommodated inside the box, along with the other functional parts.

According to the invention there is provided a mains connection box for electrical machines and appliances, on a bottom or base plate of which there are chambers to accommodate connection terminals for the wires of the connection cable, the box comprising a mounting or support for a suppressor filter and contact means for connection of contacts on the suppressor filter to wires of the connecting cable.

The connection box or its bottom panel thus itself comprises a fitting or a support for a suppressor filter and contact means for the direct connection of the suppressor filter to the connecting terminals for the wires of the mains cable.

If desired, the mains connection box can be provided with a cover.

Preferably, a per se known suppressor filter is used, of which the housing, the so-called cup, has at one end, e.g., the top end, a cover rim which projects beyond the contours of the cup. Seated on the cover or on the top of the filter cup is a pocket which consists of insulating material and which has, extending in the axial direction of the cup, contact plates which are so arranged that they project above the cover of the filter and sideways beyond the contours of the filter cup.

The mounting which the connection box has for this filter preferably consists of a recess in the bottom plate which corresponds to the cross-section or contours of the filter so that the top edge of the filter cup comes to rest on the edge of the recess. Preferably, the recess in the bottom plate has a collar around it to improve the seating.

When the filter cup has been inserted into the recess in the bottom plate, its lateral contacts simultaneously enter respective slots on the chambers or chamber widenings which are constructed on the bottom plate and which accommodate the connection terminals and in which spring contact elements are preferably disposed, each of which is connected to a connecting terminal. When the filter cup is inserted, therefore, the connection wires are at the same time directly connected to the filter.

To secure the seating, it is advantageous to provide on the bottom plate at least one catch which may be resilient and is preferably adapted to engage over the edge of the filter.

The invention can be implemented in many ways and adapted to suit differing circumstances.

Furthermore, if necessary, a radio suppressor can also be fitted, even if the appliance itself does not offer sufficient room, in that only a new connection box according to the invention and which is fitted with a radio suppressor need be used. In situations where there is no need for a cover on the mains connection box, then no cover need be fitted.

BRIEF DESCRIPTION OF THE DRAWINGS

Mains connection boxes in accordance with the invention will now be described by way of example with reference to the accompanying drawings in which:

FIGS. 1, 2 and 3 show a suppressor filter for use with a connection box according to the invention, in two side elevations which are at right-angles to each other, and in a plan view from above;

FIG. 4 shows a connection box according to the invention viewed from above (before the filter is inserted);

FIG. 5a is a cross-section taken along line Va—Va in FIG. 4,

FIG. 5 is a side view in the direction of the arrow V in FIG. 4;

FIGS. 6 and 7 show the connection box according to FIGS. 4 and 5 after the suppressor according to FIGS. 1, 2 and 3 has been inserted; and FIGS. 8 and 9 show another example of an embodiment in which a suppressor filter is supported laterally underneath the connection box, the contacts being made at the same time, FIG. 8 being a view from below and FIG. 9 being a side view in the direction of the arrow IX in FIG. 8.

DESCRIPTION OF THE PREFERRED EMBODIMENTS

The suppressor filter comprises a cylindrical housing cup 1 with a widened-out top edge 2 on which, laterally offset, a small box or pocket 3 is mounted, from which protrude three contact plates 4 which extend sideways so that, viewed in plan, these contact plates project beyond the contours of the filter.

The connection box has on its bottom plate 5 a corresponding circular cut-out or recess 6 with a downwardly projecting edge or collar 7 into which the filter cup 1 fits in such a way that its top edge 2 rests on the edge of the cut-out 6.

Also provided on the bottom plate 5 is a resilient catch 8 which engages over the edge 2 of the filter cup 1. This catch is provided close to one corner, where the necessary space is provided. Resiliently free, the catch is integrally moulded at the top end of two posts 9 which are themselves mounted on the base plate 5.

Constructed beside the cut-out 6 or seating for the filter cup 1 and in the middle portion of the bottom plate 5 there are three chambers 10 into each of which is inserted a screw terminal contact or screw-in contact to which the wires 11 of the mains cable are connected. In detail, these contact means may be constructed in any of various known manners.

According to the invention, there is integrally moulded on each chamber 10 a subsidiary chamber or widening 10a which comprises, upwardly and laterally open, a slot 12 with which a spring contact element 12a is associated. Upon insertion of the suppressor filter, a contact plate 4 engages a slot 12 and contact element 12a and electrical contact is simultaneously established.

The three screw terminal contact chambers 10 provided in the middle portion of the bottom plate 5 and on which the contact means (slots 12) for the filter are provided, are angularly offset on the bottom plate, i.e., the longitudinal axes of these contact chambers 10 form an acute angle with the longitudinal axis of the bottom plate. In this way, the insertion apertures are so staggered that the openings themselves and the direction of insertion of the conductor ends 11 are readily accessible for assembly. Provided on the marginal portion, close to a film hinge 14 for the cover, are two further contact chambers. In detail, these contact chambers and contact elements may substantially correspond to the state of the art.

A per se known tension-relieving device 13 is constructed on the corner portion which is diagonally opposite the cut-out or seating 6 provided for the suppressor filter.

Furthermore, the cover 15 has a special feature: constructed on the cover are two lateral walls 16, a longitudinal wall 17 and an (in the closed state) upper wall 18. The other longitudinal wall 19 of the box is rigidly moulded on the bottom plate 5; the cover is articulated on the upper edge of this longitudinal wall via the film hinge 14. This wall 19 has two lateral U-shaped wings 20 engaged in the closed position by the edges of the side wall 16 of the cover 15 (see FIGS. 6 and 7, FIG. 7 showing the closed position by dash-dotted lines). Thus, the cover is especially tight.

The connection box itself is fitted by a snap-action in a corresponding aperture in the housing 21 of the electrical appliance. For the purpose, rigid hooks 22 are provided on the bottom plate and engage under the aperture in the housing of the appliance while movable resilient hooks 23 are provided which also permit removal and thus separation of the connection box.

In known manner, there is furthermore, projecting beyond the bottom plate, a metal earthing tab 24 for earthing a metal housing of the appliance.

In the event of the electrical appliance having no space for the suppressor filter immediately under the connection box but possibly alongside it, then the embodiment according to FIGS. 8 and 9 is applicable.

On one edge of the bottom plate 5, at a distance from each other, there are two downwardly directed lateral resilient wings 25, each of which has a grove 26 for engaging the edge 2 of the filter cup 1. Associated with these wings 25 is a (in plan view) U-shaped retaining clip 27 which extends under the underside of the wall 21 of the appliance and into the interior thereof, its rear downwardly pointing transverse web 28 engaging under the rear end of the filter 1 or a rear threaded journal on the filter 1.

It is possible reliably and also easily to insert the filter into this support, and at the same time its laterally upwardly projecting contact plates 4 can engage corresponding per se known contact spring elements, making contact therewith, these latter being respectively accommodated on the associated contact chamber. Thus, in this case, when the filter is inserted into its support, an electrically conductive connection is at the same time established with the connecting wires which are to be protected.

I claim:

1. A mains connection box for mounting on a housing for an electrical machine and an appliance, comprising a bottom plate, chambers on said bottom plate to accommodate connection terminals for wires of a connection cable, a mounting for a suppressor filter provided with contact plates which extend laterally beyond its contours, and contact means being provided for connection of the contact plates to the connection terminals for the wires of the connection cable.

2. A mains connection box according to claim 1, in which the mounting comprises a cut-out in the bottom plate which corresponds to the cross-section of the filter and on which there is formed an edge extend, and on the chambers or on lateral widened portions of the chambers there are, upwardly and laterally open towards the mounting for the filter insertion slots each of which is intended to accommodate a contact plate of the filter, the insertion slots having associated with them spring contact elements, each of which is connected to a connection terminal.

3. A mains connection box according to claim 2, in which beside the bottom plate there is at least one resilient catch which engages over an edge of the filter which rests on the edge of the mounting for the filter.

4. A mains connection box according to claim 1, in which said bottom plate is rectangular, a tension relieving device is disposed on one narrow side of the rectangular bottom plate and the mounting for the filter is disposed alongside another narrow side, and the chambers for accommodating the connection terminals are provided alongside one another on the middle portion of the bottom plate.

5. A mains connection box according to claim 4, in which there is provided a cover for said box, the chambers are constructed diagonally on the bottom plate so that a longitudinal axis of the chambers encloses an angle with a longitudinal axis of the bottom plate, and close to one edge of the bottom plate which is towards the cover there are further chambers for connection terminals.

6. A mains connection box according to claim 1, in which as a support there are on the underside of the bottom plate two lateral resilient wings, each with a groove for engaging an edge of the filter and a clip, a transverse web of which engages under a rear end of the filter or a rear threaded journal on the filter, spring contact parts being provided on the underside of the bottom plate to make contact with contacts of the filter.

7. A mains connection box according to claim 1, in which along one long side of the bottom plate there is a raised wall on an upper edge of which there is an integrally moulded film joint for a cover.

8. A mains connection box according to claim 7, in which integrally moulded on the wall are cross-sectionally U-shaped lateral wings to receive edges of webs of the cover.

* * * * *